United States Patent
Brueck

[11] Patent Number: 5,579,560
[45] Date of Patent: Dec. 3, 1996

[54] CABLE CLAMP

[75] Inventor: Guenter Brueck, Midland, Canada

[73] Assignee: Hughes Electronics, Los Angeles, Calif.

[21] Appl. No.: 394,985

[22] Filed: Feb. 27, 1995

[51] Int. Cl.$^6$ .................................................. F16G 11/00
[52] U.S. Cl. .................................. 24/135 R; 24/115 R
[58] Field of Search ...................... 24/135 R, 135 A, 24/135 K, 135 N, 136 B, 115 R; 403/300, 307, 342; 411/392, 340

[56] References Cited

U.S. PATENT DOCUMENTS

| | | | |
|---|---|---|---|
| 1,273,922 | 7/1918 | Prattinger | 24/135 N |
| 2,218,210 | 10/1940 | Mebold | 24/135 R |
| 2,356,014 | 8/1944 | Wade et al. | 411/395 |
| 2,359,632 | 10/1944 | Eales | 24/135 R |
| 2,542,377 | 2/1951 | Turkish | 411/392 |
| 3,103,344 | 9/1963 | Figge | 24/135 N |

Primary Examiner—Peter M. Cuomo
Assistant Examiner—Hanh V. Tran
Attorney, Agent, or Firm—Michael W. Sales; Wanda K. Denson-Low

[57] ABSTRACT

A clamp and clamping technique which provides a secure attachment to a wire or cable with minimal damage thereto. The inventive clamp (10) includes an elongate bolt (14). The distal end is threaded and has first, second and third bores (18, 20 and 22) therein. The first bore (18) extends along the longitudinal axis of the bolt (14). The second bore (20) extends through the bolt (14) along a second axis transverse to the longitudinal axis. The second bore (20) is in communication with the first bore (18). The third bore (22) extends through the distal end of the bolt (14) parallel to the second bore (20). A nut (16) is provided which is adapted for threaded engagement with the distal end of the bolt (14). In accordance with the novel method, a wire or cable (28) is fed through the nut (16) and the first, second, and third bores (18, 20 and 22) in no particular order. The wire or cable (28) is wrapped around the distal end of the bolt (14) and secured to the bolt (14) by the nut (16).

4 Claims, 3 Drawing Sheets

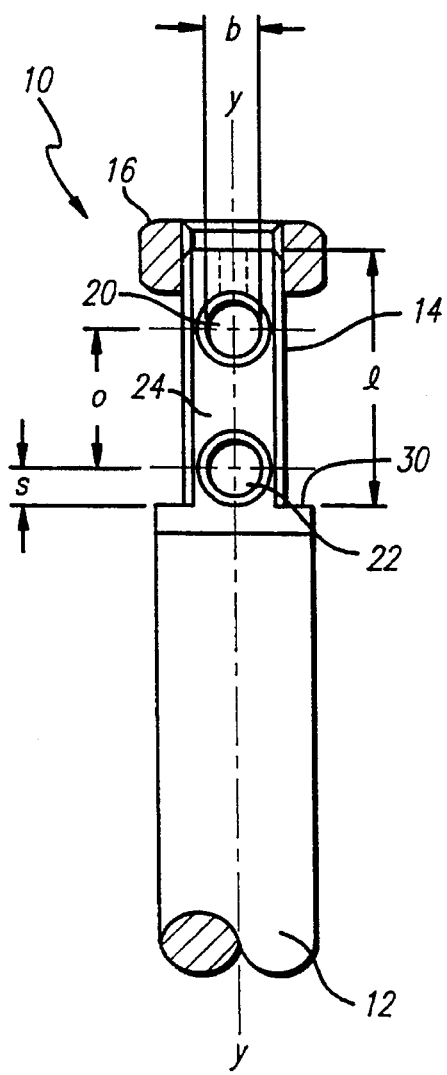
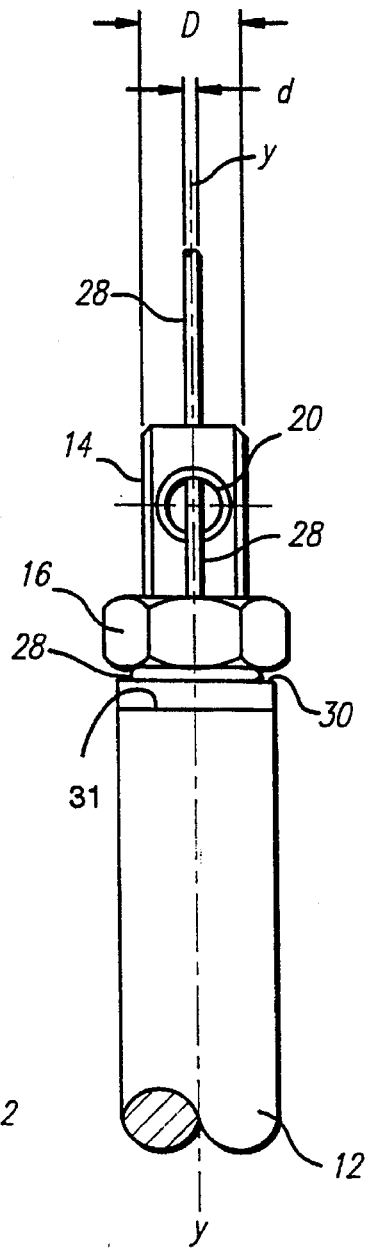
FIG. 1
FIG. 3
FIG. 2

CABLE CLAMP

BACKGROUND OF THE INVENTION

1. Field of the Invention

The present invention relates to cable clamping apparatus.

2. Description of the Related Art

For many applications, there is a need for a clamping arrangement which securely holds a wire or cable with low clamp force to prevent damage to the clamped cable. In addition, there is a need for a detachable, compact clamp which provides an interlocking, slip-free and tear-off-safe wire or cable attachment with easy wire or cable length adjustment.

Hence, there is a need for further improvements in the design of wire and cable clamps.

SUMMARY OF THE INVENTION

The need in the art is addressed by the clamp and clamping technique of the present invention. The inventive clamp includes an elongate bolt. The distal end is threaded and has first, second and third bores therein. The first bore extends along the longitudinal axis of the bolt. The second bore extends through the bolt along a second axis transverse to the longitudinal axis. The second bore is in communication with the first bore. The third bore extends through the distal end of the bolt parallel to the second bore. A nut is provided which is adapted for threaded engagement with the distal end of the bolt.

In accordance with the novel method, a wire or cable is threaded through the nut and the first, second, and third bores in no particular order. The wire or cable is wrapped around the distal end of the bolt and secured to the bolt by the nut.

The invention provides an interlocking, slip-free and tear-off-safe wire or cable attachment with easy wire or cable length adjustment. In addition, the invention offers a low screw clamp force requirement, a detachable connection and a compact over-all design.

BRIEF DESCRIPTION OF THE DRAWINGS

FIG. 1 is a front elevational view of the inventive cable clamp in an open position with a nut shown in section.

FIG. 2 is a sectional side view of the clamp of the present invention.

FIG. 3 is a front elevational view of the inventive cable clamp in the closed position.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a front elevational view of the inventive cable clamp in an open position with a nut shown in section.

Figure 1A:
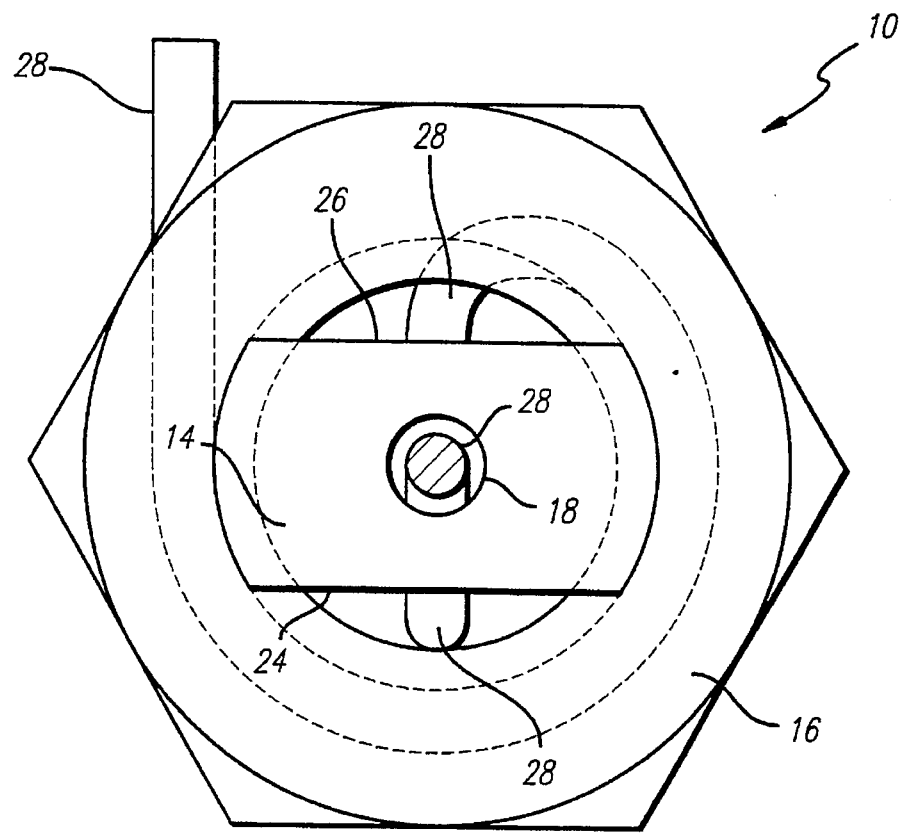
FIG. 1a is a top view of the clamp of the present invention.

FIG. 1a is a top view of the clamp of the present invention.

FIG. 2 is a sectional side view of the clamp 10 of the present invention.

FIG. 3 is a front elevational view of the inventive cable clamp in the closed position.

As illustrated in the figures, the clamp 10 includes a clamp stud 12 with a threaded bolt 14 and a hexagonal nut 16. The stud, bolt and nut may be constructed of steel or other suitable material. The bolt and nut are adapted for threaded engagement. As can be seen in FIG. 1, the distal end of the bolt has diameter which is less than that of the proximal end. The bolt 14 has first, second and third bores 18, 20 and 22, respectfully, therein. The bolt 14 is truncated to provide a gap large enough to fit the wire or cable through the inner thread diameter of the nut, when the nut is threaded close to the shoulder 30. This reduces the clamping force required to hold the wire or cable.

As best illustrated in FIG. 1a, the first bore is a centerbore which extends into the bolt 14 along the longitudinal axis y—y thereof.

As illustrated in FIG. 1, the second bore 20 extends through the bolt 14 along a second axis x—x (FIG. 2) transverse to the longitudinal axis. The second bore 20 is in communication with the first bore 18. The third bore 22 extends through the distal end of the bolt 14 parallel to the second bore 20.

In the preferred embodiment, the threaded bolt 14 has a diameter $D=6.667\ d$ and a length $l=2.1$ to $2.5\ D$. The centerbore has a diameter $c=1.67\ d$, where d is the diameter of the wire or cable 28. The second and third bores 20 and 22 are chamfered holes separated by an axial distance of $a=1.1$ to $1.5\ D$, each having a diameter $b=3\ d$. The distance 's' between the center of the third bore 22 and the top of the stud 12 is preferably $0.25\ D$. The outside diameter of the 45 degree chanfer is $0.7\ D$ in the preferred embodiment.

The upper or distal end of the truncated bolt 14 has two parallel flat surfaces 24 and 26. The thickness 't' of the bolt 14 at the distal end is preferably given by:

$$t=D-2(0.4P+d)$$

where p is the thread pitch. The length of the flat surfaces 24 and 26 extends the length of the bolt by $2\ d$.

In accordance with the novel method, the nut 16 is positioned on top of the threaded bolt 14. The wire or cable 28 is fed through the centerbore 18, out the upper bore 20 and back into the lower bore 22. At this point, the wire or cable 28 should be adjusted in length. Next, the nut is threaded close to the shoulder 30 of the stud 12 while allowing enough clearance for the wire or cable 28 to be wound around the threaded bolt for one-half a coil. Then, the nut is set with a suitable torque and sealed if required. In addition, a washer (not shown) could be used under the nut 16. At this point, the extended end of the wire or cable should be cut.

Figure 4:
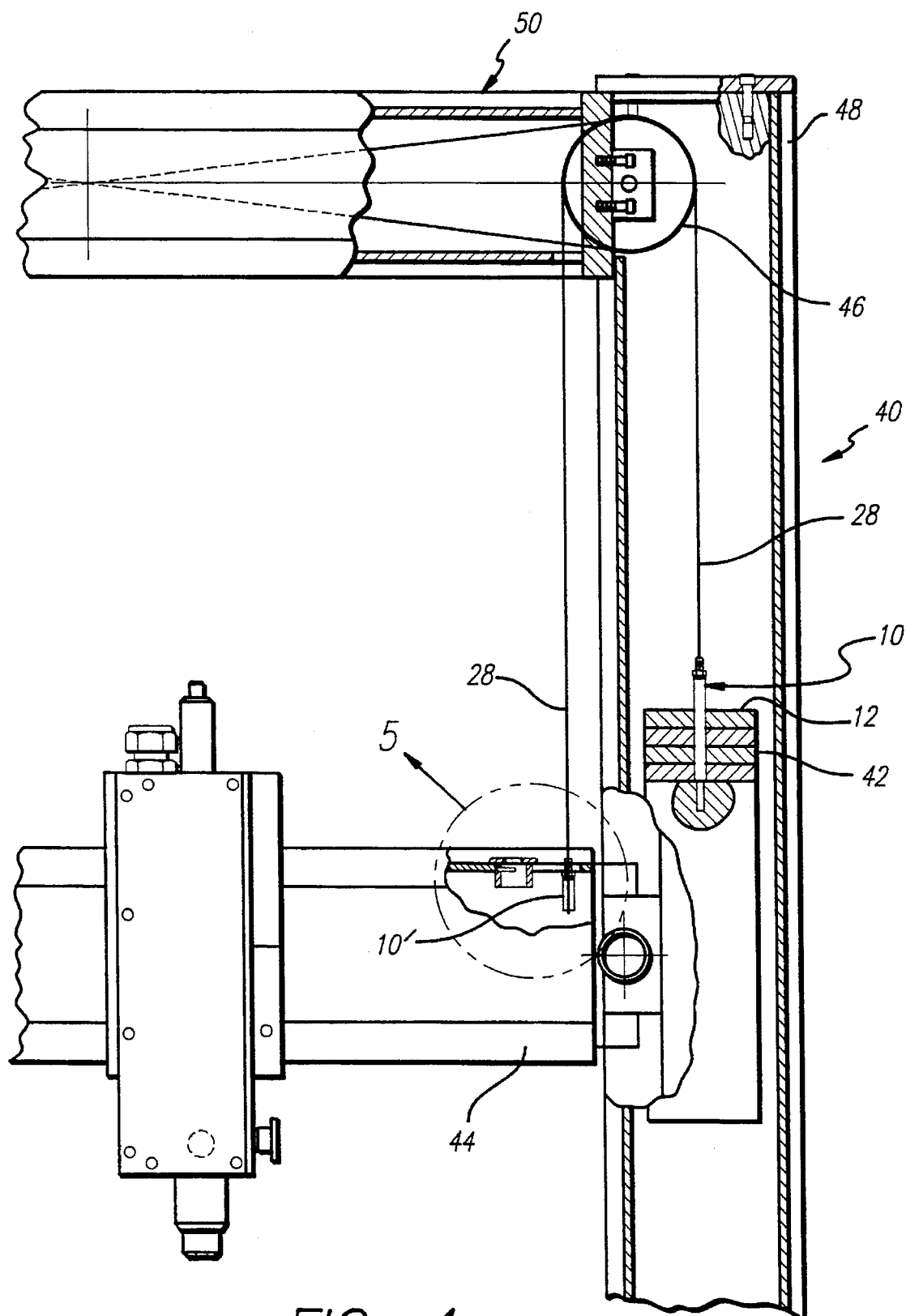
FIG. 4 shows an illustrative application of the clamp of the present invention.

FIG. 4 shows an illustrative application of the clamp of the present invention. As shown in FIG. 4, the arrangement 40 includes a clamp 10 constructed in accordance with the present teachings. A plurality of weights 42 are supported by the stud 12 of the clamp 10 on a cable 28. The cable 28 is wrapped once or twice over a pully 46 in the upper section 48 of the frame 50. The second end of the cable 28 is secured by a second clamp 10' constructed in accordance with the present teachings.

Figure 5:
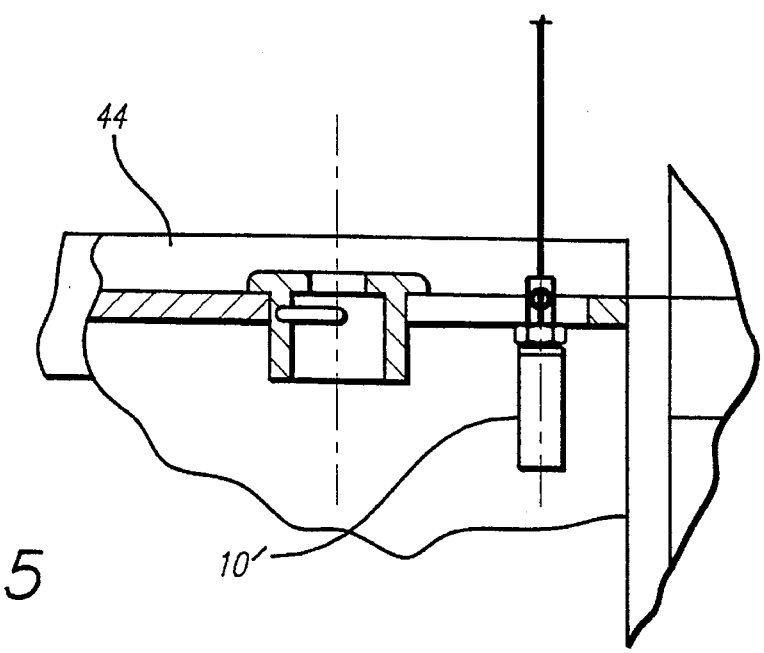
FIG. 5 is a magnified view of the second clamp in the application of FIG. 4.

FIG. 5 is a magnified view of the second clamp and beam 44 of FIG. 4. Those skilled in the art will recognize numerous additional applications for the clamp of the present invention.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A cable clamp comprising:

a bolt having a longitudinal axis, a distal end and a proximal end, said distal end being threaded and having a first bore therein extending along said longitudinal axis, a second bore extending therethrough along a second axis transverse to said longitudinal axis, said second bore being in communication with said first bore, and a third bore extending through said distal end of said bolt parallel to said second bore and a nut adapted for threaded engagement with said distal end of said bolt.

2. A method for securing an elongate strand of material including the steps of:

providing a cable clamp comprising:

a bolt having a longitudinal axis, a distal end and a proximal end, said distal end being threaded and having a first bore therein extending along said longitudinal axis, a second bore extending therethrough along a second axis transverse to said longitudinal axis, said second bore being in communication with said first bore, and a third bore extending through said distal end of said bolt parallel to said second bore and a nut adapted for threaded engagement with said distal end of said bolt;

first threading said material through said nut;

next threading said material through said first, second and third bores;

then wrapping said material around said distal end of said bolt; and screwing said nut onto said bolt until said material is secured between said nut and said bolt.

3. The invention of claim 1 wherein said distal end of said bolt has at least one planar surface lying in a plane parallel with said longitudinal axis and transverse with said second axis intersecting said second and said third bores.

4. A cable and clamp assembly comprising:

a clamp including:

a bolt having a longitudinal axis, a distal end and a proximal end, said distal end being threaded and having a first bore therein extending along said longitudinal axis, a second bore extending therethrough along a second axis transverse to said longitudinal axis, said second bore being in communication with said first bore, and a third bore extending through said distal end of said bolt parallel to said second bore and a nut adapted for threaded engagement with said distal end of said bolt and a flexible elongate member extending through said first bore and said second bore into and out of said third bore and at least partially around said bolt where it is secured by said nut to said bolt.

\* \* \* \* \*